(12) United States Patent
Craig (10) Patent No.: US 11,383,552 B2
(45) Date of Patent: Jul. 12, 2022

(54) FLAT TIRE SAFETY INSERT

(71) Applicant: RETTROBANDS, LLC, Plano, TX (US)

(72) Inventor: Robert Craig, Arundel (AU)

(73) Assignee: RETTROBANDS, LLC, Plano, TX (US)

( * ) Notice: Subject to any disclaimer, the term of this patent is extended or adjusted under 35 U.S.C. 154(b) by 149 days.

(21) Appl. No.: 16/807,408

(22) Filed: Mar. 3, 2020

(65) Prior Publication Data
US 2020/0282768 A1 Sep. 10, 2020

Related U.S. Application Data (60) Provisional application No. 62/910,031, filed on Oct. 3, 2019, provisional application No. 62/815,707, filed on Mar. 8, 2019.

(51) Int. Cl.
*B60B 21/12* (2006.01)
(52) U.S. Cl.
CPC .................................. *B60B 21/12* (2013.01)
(58) Field of Classification Search
CPC ....................................................... B60B 21/12
See application file for complete search history.

(56) References Cited

U.S. PATENT DOCUMENTS

| | | | | |
|---|---|---|---|---|
| 1,415,401 A * | 5/1922 | Rollins | ................ | B60R 25/093 70/18 |
| 6,698,481 B1 * | 3/2004 | Marin | .................... | B60B 21/12 152/381.5 |
| 7,475,713 B2 * | 1/2009 | Naito | ..................... | B60B 21/12 152/400 |
| 7,789,116 B2 * | 9/2010 | Campbell | .............. | B60C 17/04 152/152 |
| 8,733,413 B2 | 5/2014 | Glazebrook | | |
| 9,873,294 B2 * | 1/2018 | Lust | ....................... | B60C 17/00 |
| 2002/0157752 A1 * | 10/2002 | Tabor | .................... | B60C 17/04 152/522 |

(Continued)

OTHER PUBLICATIONS

Tyron Runflat Literature, date unknown.

*Primary Examiner* — Scott A Browne
(74) *Attorney, Agent, or Firm* — Gordon Rees Scully Mansukhani, LLP (57) ABSTRACT

A flat tire safety system, having: (a) a pair of elongated semicircular members dimensioned to wrap around a tire rim and be positioned within a tire; and (b) a pair of clamping assemblies, each clamping assembly securing an end of the first elongated semicircular member to the end of the second elongated semicircular member, wherein each clamping assembly has: (i) a housing, (ii) a double-headed bolt passing through the housing, (iii) a tightening bolt mounted in the housing, wherein rotating the tightening bolt turns the double-headed bolt, (iv) a ratchet on the housing for permitting the tightening bolt to rotate in a tightening direction and preventing the tightening bolt from rotating in a loosening direction, (v) a release on the housing for selectively permitting the tightening bolt to rotate in the loosening direction, and (c) a pair of anchors, wherein each anchor is embedded in the end of one of the elongated semicircular members, and wherein one end of the double-headed bolt passes through each of the anchors.

15 Claims, 11 Drawing Sheets

(56) References Cited

U.S. PATENT DOCUMENTS

| | | | |
|---|---|---|---|
| 2003/0160501 A1* | 8/2003 | Lust | B60C 17/041 |
| | | | 301/11.2 |
| 2011/0030869 A1* | 2/2011 | Marsaly | B60C 17/06 |
| | | | 24/19 |
| 2019/0344627 A1* | 11/2019 | Saito | B60B 21/12 |

* cited by examiner

FLAT TIRE SAFETY INSERT

RELATED APPLICATIONS

The present invention claims priority to U.S. Provisional Patent Applications 62/815,707, of same title filed Mar. 8, 2019, and to 62/910,031 also of same title, filed Oct. 3, 2019, the entire disclosures of which are incorporated herein by reference in their entireties.

TECHNICAL FIELD

The present invention relates to safety inserts that are positioned within vehicle tires that provide safety protection in the event of a flat tire by providing a support under the flat tire that prevents the vehicle from driving down on the tire rim.

SUMMARY OF THE INVENTION

In preferred aspects, the present system provides a safety insert that is positioned underneath of a vehicle tire. Should the vehicle tire become flat, the present system provides support, thereby preventing the vehicle from driving down on the tire rim until the tire can be changed.

In preferred embodiments, the present safety system comprises a plurality of elongated curved members (most preferably being a pair of elongated semicircular members) and a plurality (preferably a pair) of clamping assemblies holding the ends of the elongated semicircular members to one another. The elongated curved members are dimensioned to wrap around a tire rim and be positioned within (i.e.: underneath) of the tire. In optional preferred aspects, the curved members can be reinforced with an interior steel band disposed therein. Preferably, each clamping assembly comprises: a housing, a double-headed bolt passing through the housing, and a tightening bolt mounted within the housing. Rotating the tightening bolt turns the double-headed bolt, thereby pulling the two elongated members together. Also provided is a ratchet on the housing for permitting the tightening bolt to rotate in a tightening direction, but preventing the tightening bolt from rotating in a loosening direction. A release may also be provided on the housing for selectively permitting the tightening bolt to rotate in the loosening direction. A pair of anchors is also provided, wherein each anchor is embedded in the end of one of the elongated semicircular members, and wherein one end of the double-headed bolt passes through each of the anchors.

A first advantage of the present system is that the inserts are easy to connect together. Preferably, the ends of the elongated semicircular members are simply received into one another in a male-to-female connecting interface. This design gives strength to the system, (by helping to hold the ends of the two members together). Most preferably, the clamping assemblies are positioned beside the male-to-female connecting interface with the clamping assemblies positioned towards the inner perimeter of the wheel and the male-to-female connecting interface positioned towards the outer perimeter of the device. The anchors are positioned within the ends of the elongated semicircular members and are pulled together as the double-headed bolt is tightened (i.e.: rotated in a first direction).

The present elongated semicircular members may optionally be made of polyurethane or rubber or other suitable material. Optional interior reinforcement bands in the polyurethane or rubber may be made of steel or other suitable materials.

In preferred embodiments, the exterior perimeter of the elongated members can be flattened. This has the advantage of providing a solid, wide contacting surface in the event of a flat tire. In addition, the interior perimeter of the elongated members can also be flattened, thereby making the present system ideally suited for use with a vehicle wheel that does not have a wheel well.

DETAILED DESCRIPTION OF THE DRAWINGS

Figure 1:
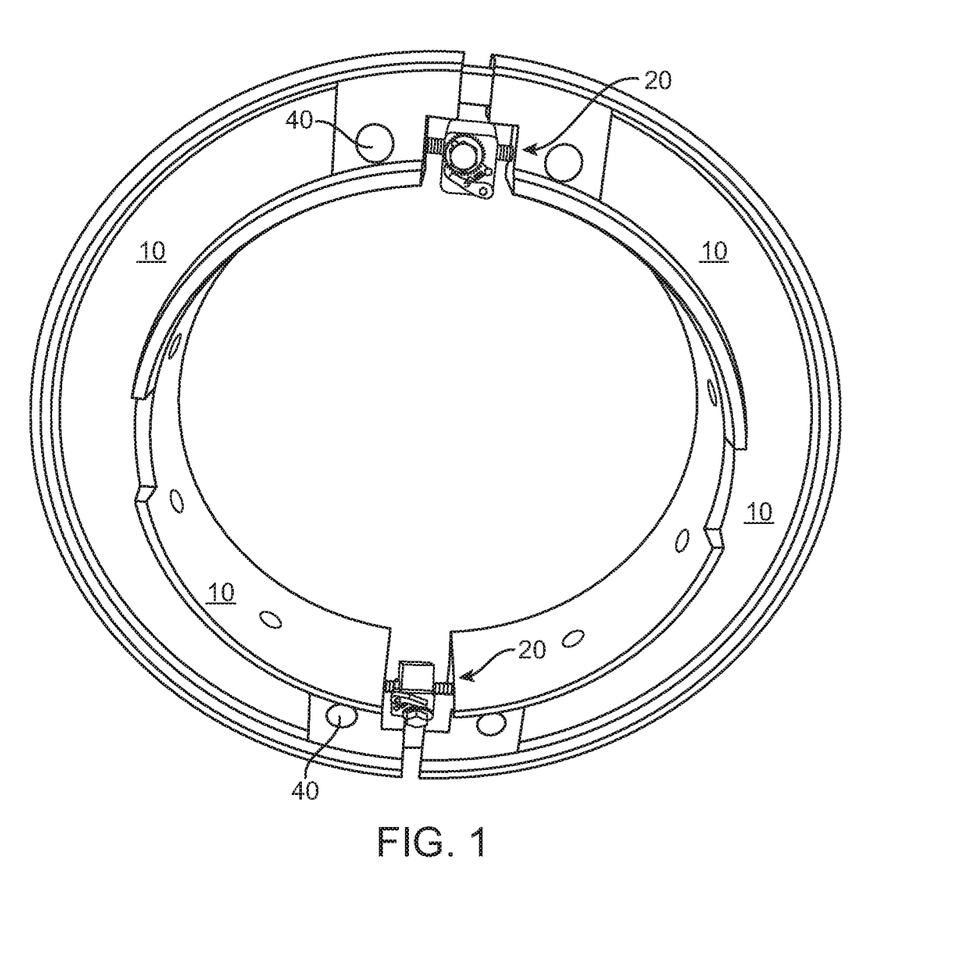
FIG. 1 is a perspective view of the present system.

FIG. 1 is a perspective view of the present system showing a pair of elongated semicircular members 10 dimensioned to wrap around a tire rim and be positioned within a tire. (It is to be understood that although the present system preferably uses a pair of semicircular members, any number of curved members can be used, all keeping within the present scope of the preferred system). A pair of clamping assemblies 20 are also provided. Each clamping assembly 20 secures an end of a first elongated semicircular member 10 to the end of the second elongated semicircular member 10.

Figure 2:
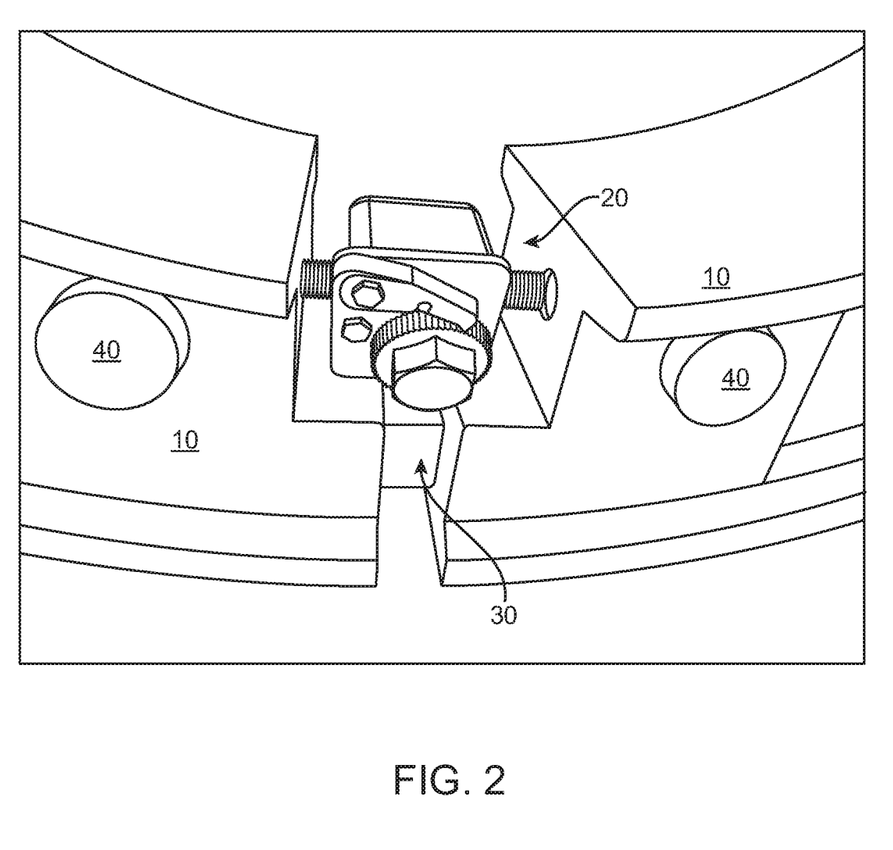
FIG. 2 is a close-up perspective view of the bottom of the present system, showing one of the clamping assemblies and the male-to-female connecting interface of the two elongated semicircular members.
Figure 3:
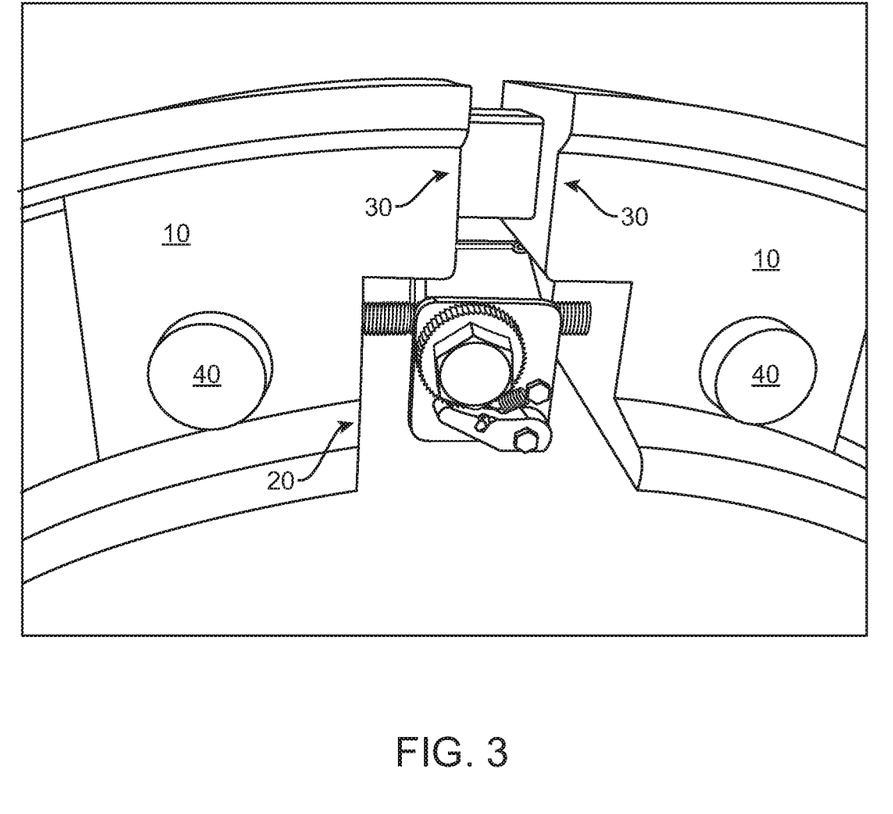
FIG. 3 is a close-up perspective view of the top of the present system, similar to FIG. 2.

FIGS. 2 and 3 each showing a clamping assembly 20 positioned next to a male-to-female connecting interface 30 of the two elongated semicircular members 10.

Figure 4:
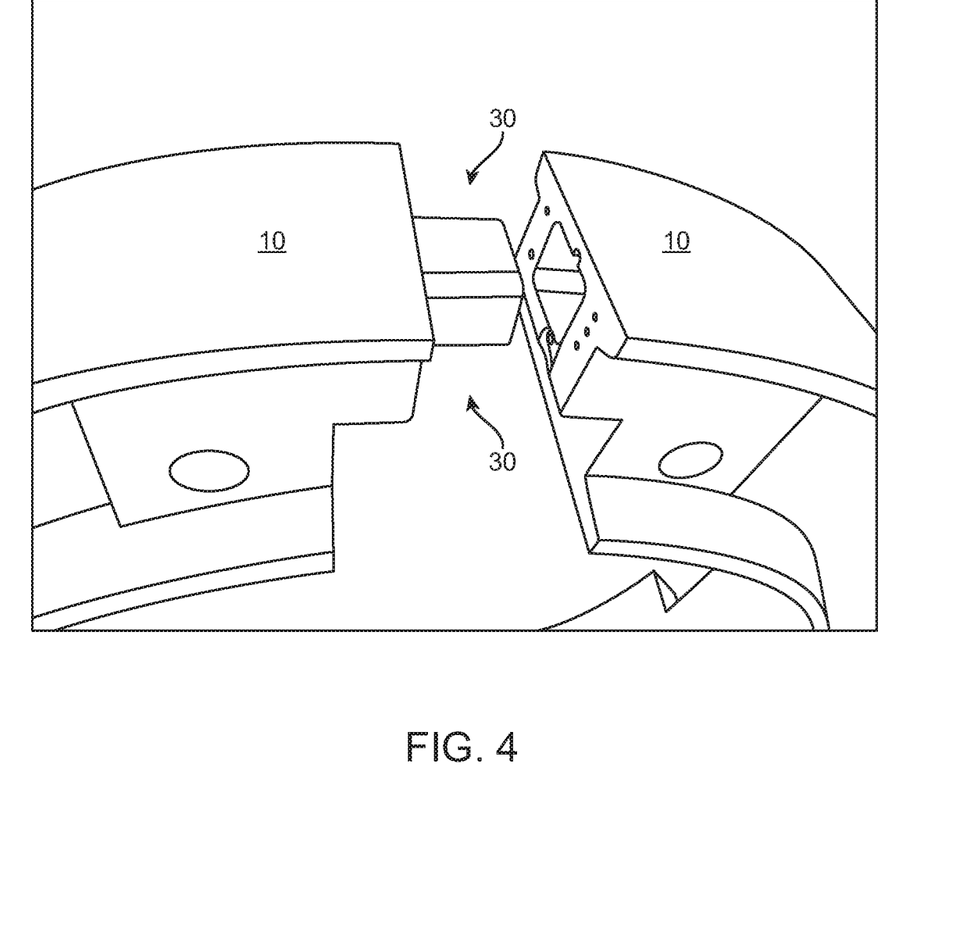
FIG. 4 is a view of the male-to-female connecting interface of the two elongated semicircular members.

FIG. 4 is a view of the male-to-female connecting interface 30 of the two elongated semicircular members 10.

Figure 5:
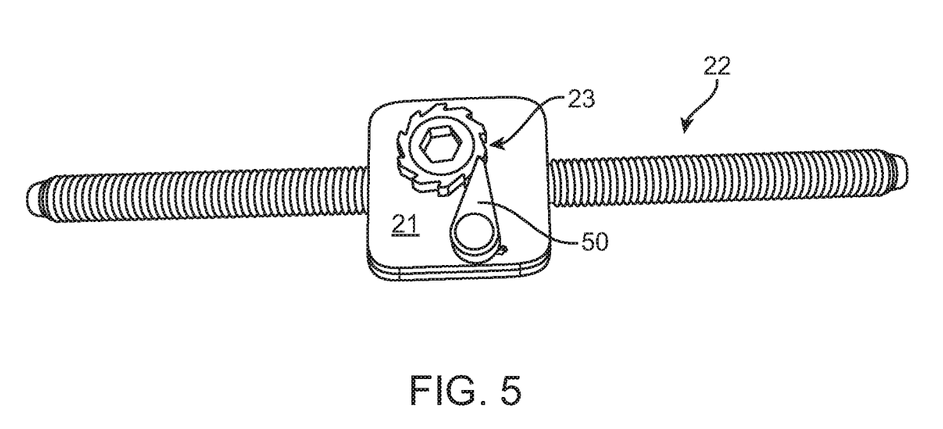
FIG. 5 is a view of one of the clamping assemblies showing the ratchet and the double-headed bolt passing through the housing.
Figure 6:
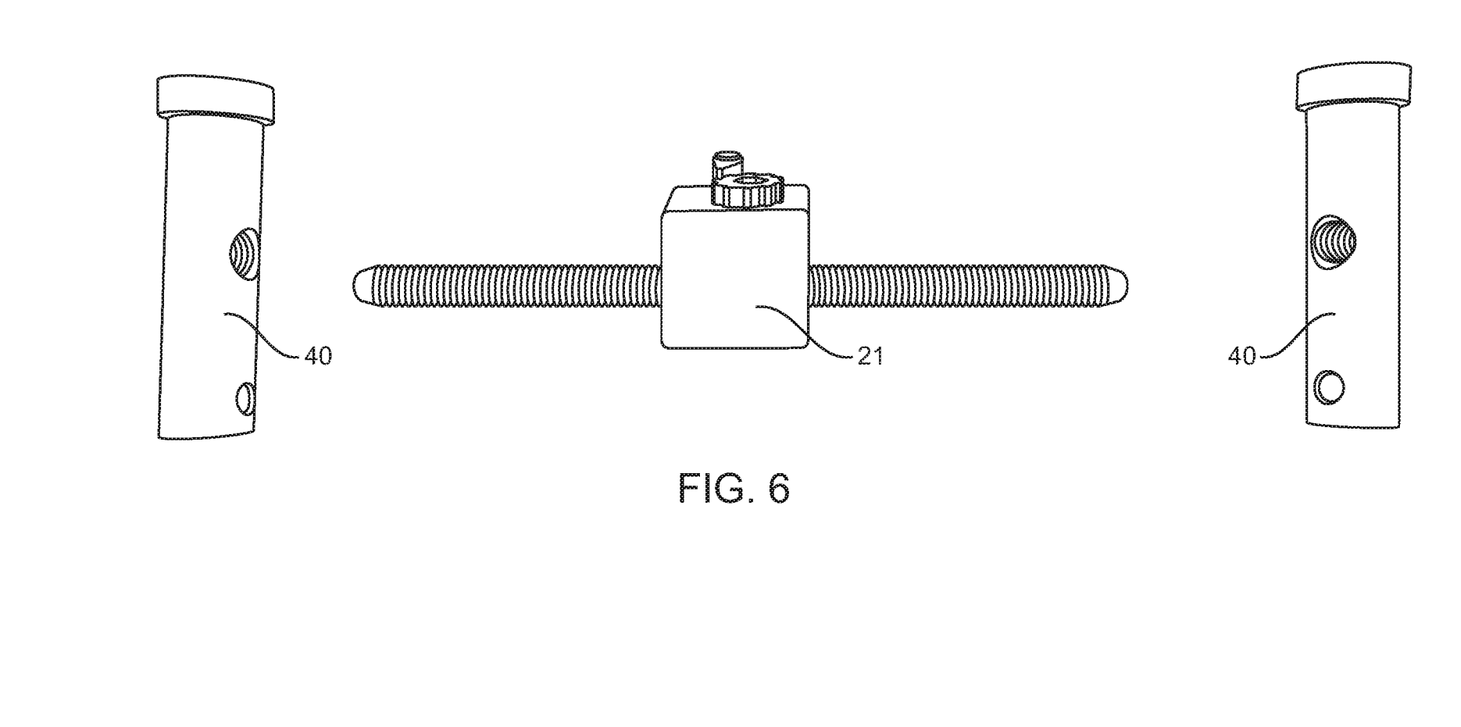
FIG. 6 is a side view similar to FIG. 5, adding the pair of anchors, showing the mating threading between the double-headed bolt and the anchors.

FIGS. 5 to 8 illustrate the clamping assemblies in more detail. In preferred aspects, each clamping assembly 20 comprises: a housing 21, a double-headed bolt 22 passing through housing 21, and a tightening bolt 23 mounted in housing 21. Rotating tightening bolt 23 turns the double-headed bolt 22. As seen in FIGS. 1, 2 and 3, a pair of anchors 40 is also provided. Anchors 40 are each embedded in the end of one of the elongated semicircular members 20, and (as seen in FIG. 6), one end of the double-headed bolt 22 passes through each of the anchors 40. Preferably, anchors 40 can be received into holes in the elongated semicircular members (in the case of polyurethane members), or molded into the elongated semicircular members (in the case of rubber members).

Figure 7:
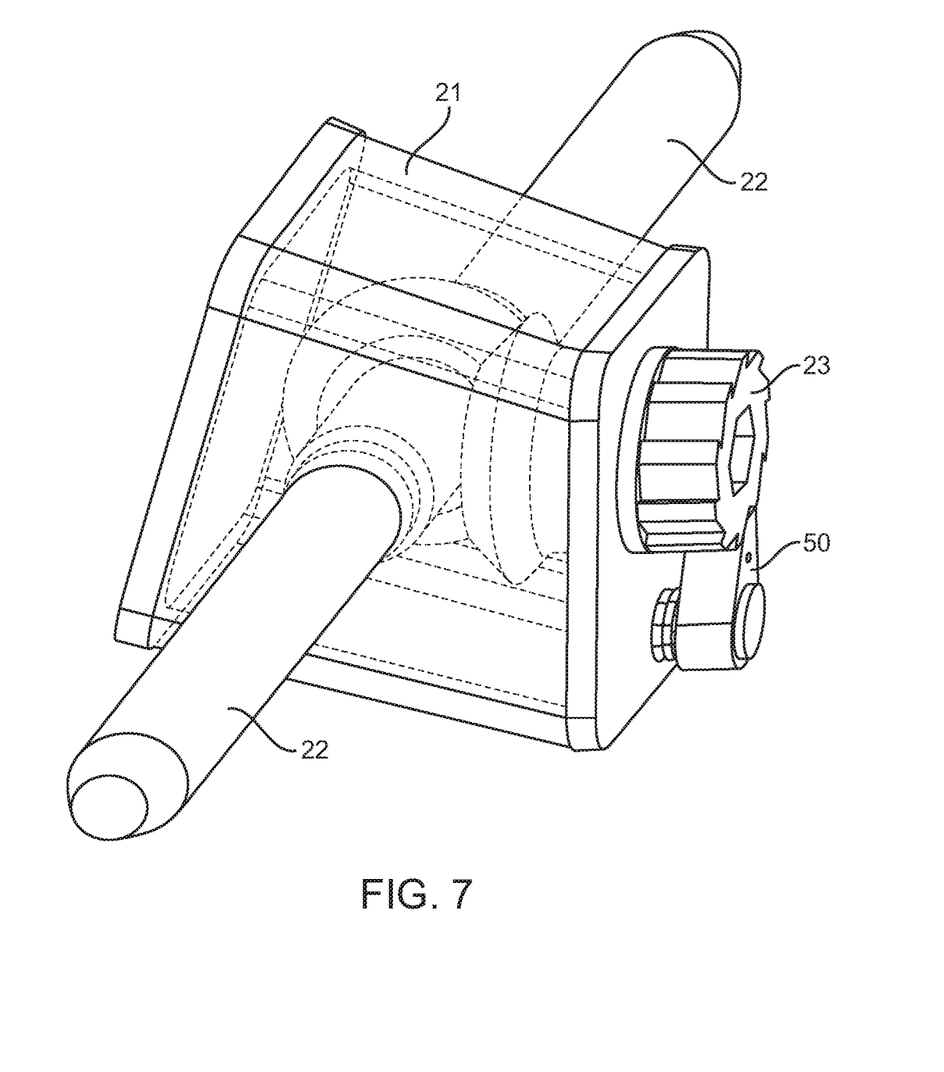
FIG. 7 is an illustration of the components in the housing.

FIG. 7 is an illustration of the components in the housing. In operation, tightening bolt 23 is rotated, causing double-headed bolt 22 to rotate, thereby pulling anchors 40 together, thus firmly holding together the male-to-female connecting interface 30 of the two elongated semicircular members 10.

Figure 8:
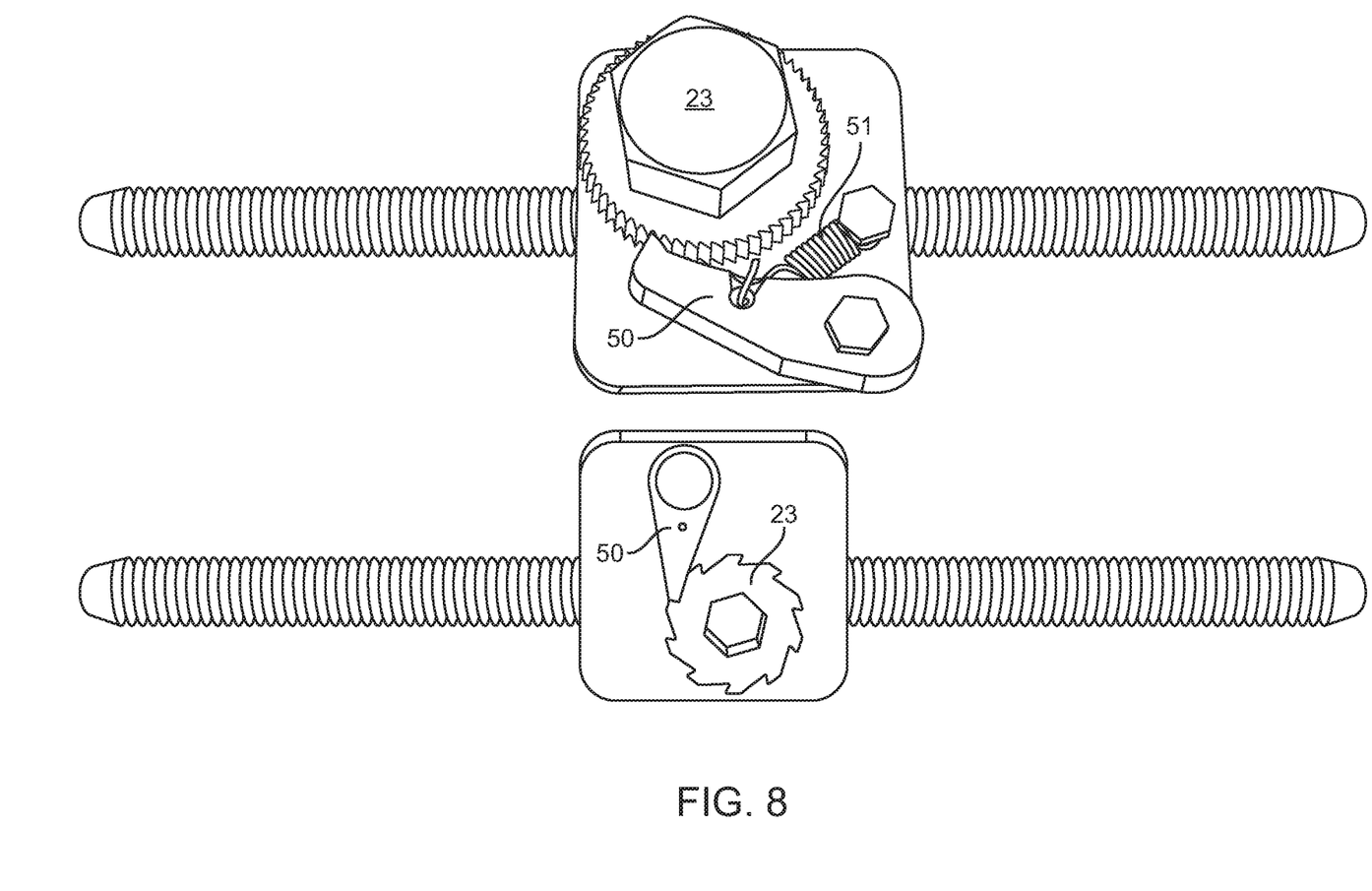
FIG. 8 is an illustration of two different embodiments of the housing, with one of the ratchets having a spring-lock mechanism.

As can also be seen in FIGS. 5, 7 and 8, a ratchet mechanism may be included.

Specifically, a ratchet on the housing permits tightening bolt 23 to rotate in a tightening direction, yet prevents the tightening bolt from rotating in a loosening direction. A release 50 on the housing can be moved away from the ratchet to permit tightening bolt 23 to rotate in the loosening direction.

FIG. 8 is an illustration of two different embodiments of the housing, with one of the ratchets having a spring-lock mechanism 51.

In operation, the present system's pair of elongated semicircular members 10 are wrapped around a tire rim (so as to later be positioned underneath the tire). The installer then couples the ends of the elongated semicircular members 10 together by sticking the male end of the interface into the female end of the interface. The elongated semicircular members 10 are thus stuck together at both ends. Next, the installer tightens the two tightening bolts 23 on the opposite sides of the system. This secures the elongated semicircular members 10 tightly around the wheel rim.

As can be seen in FIGS. 2 and 3, the clamping assemblies 20 are positioned beside the male-to-female connecting interface 30, most preferably with the clamping assemblies 20 positioned inwardly (i.e.: towards the center of the wheel) from the male-to-female connecting interface 30.

In preferred embodiments, as seen in FIGS. 1 and 2, the exterior perimeter of the elongated members can be flattened. This has the advantage of providing a large contact surface in the event of a flat tire. As can also be seen in FIGS. 1 and 2, the interior perimeter of the elongated members can also be flattened. As such, the present system is ideally suited for use with a vehicle wheel that does not have a wheel well.

Figure 9:
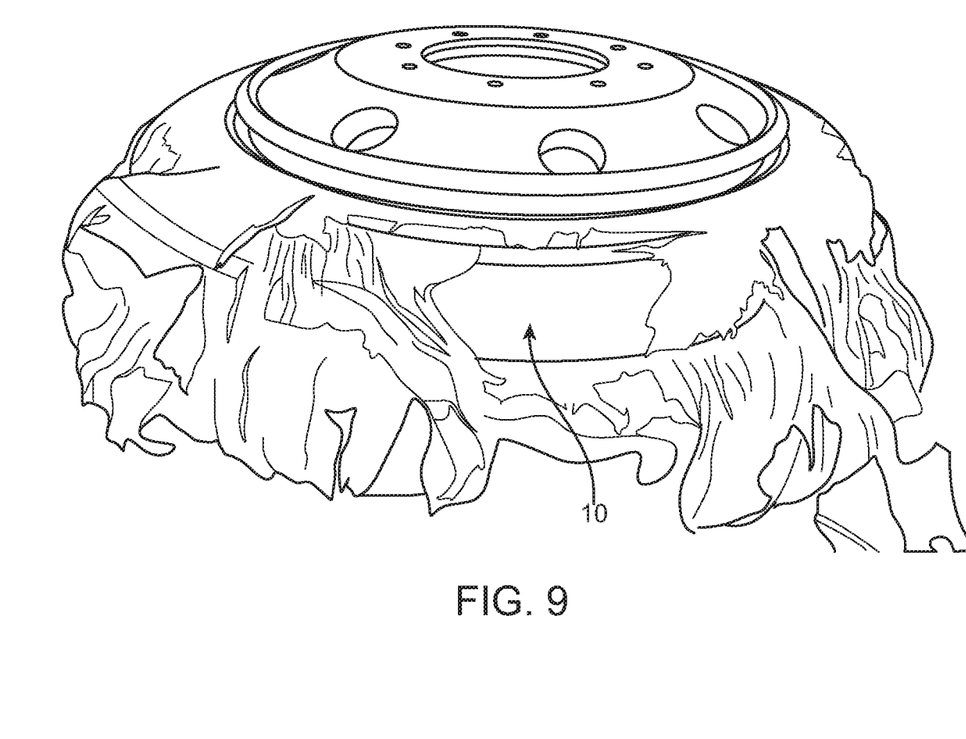
FIG. 9 is an illustration of a test performed on a blown tire to show that the present system provides enough support to advantageously prevent damage to the wheel rim after a tire has blown.

FIG. 9 is an illustration of a test performed on a blown tire to show that the present system provides enough support to advantageously prevent damage to the wheel rim after a tire has blown. Specifically, one of the semi-circular members 10 can be seen under the blown out tire.

Figure 10:
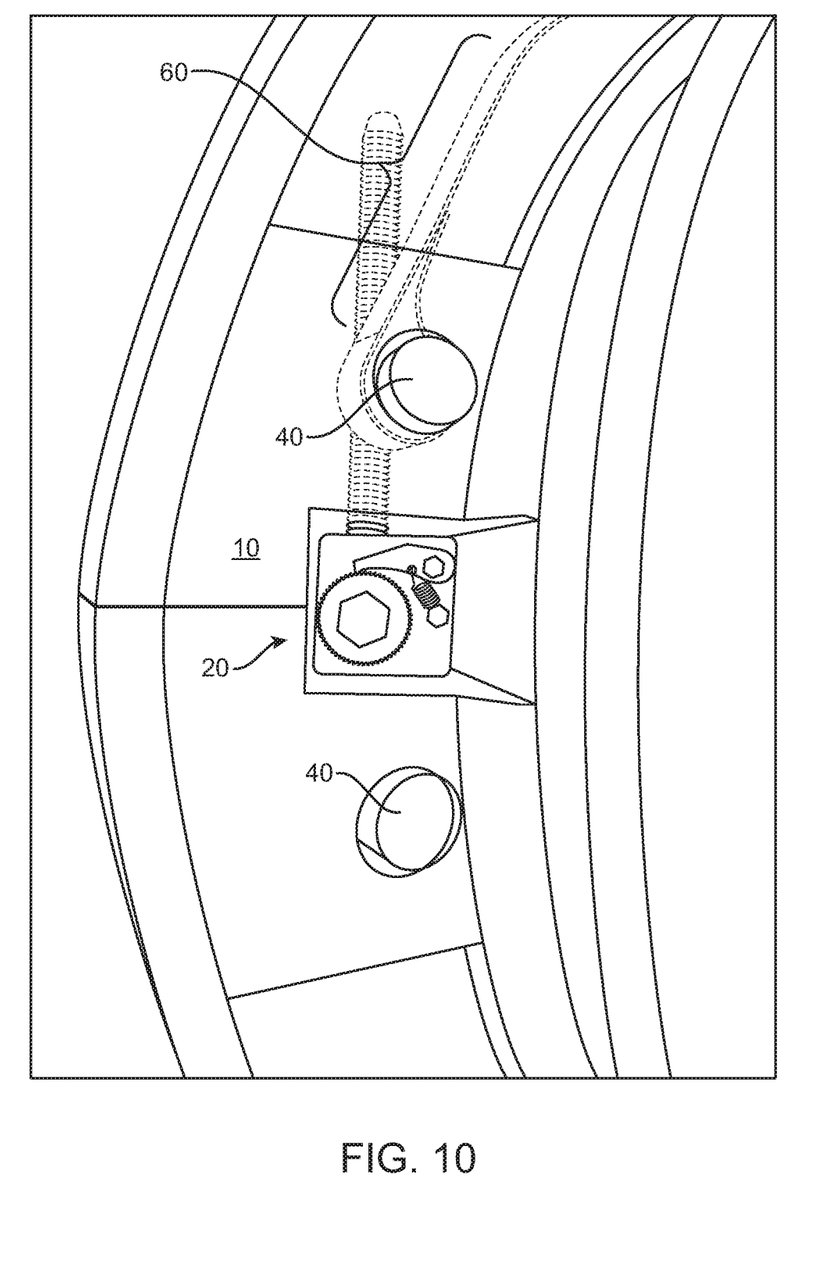
FIG. 10 is an illustration of an optional reinforcement band within one of the semi-circular members.
Figure 11:
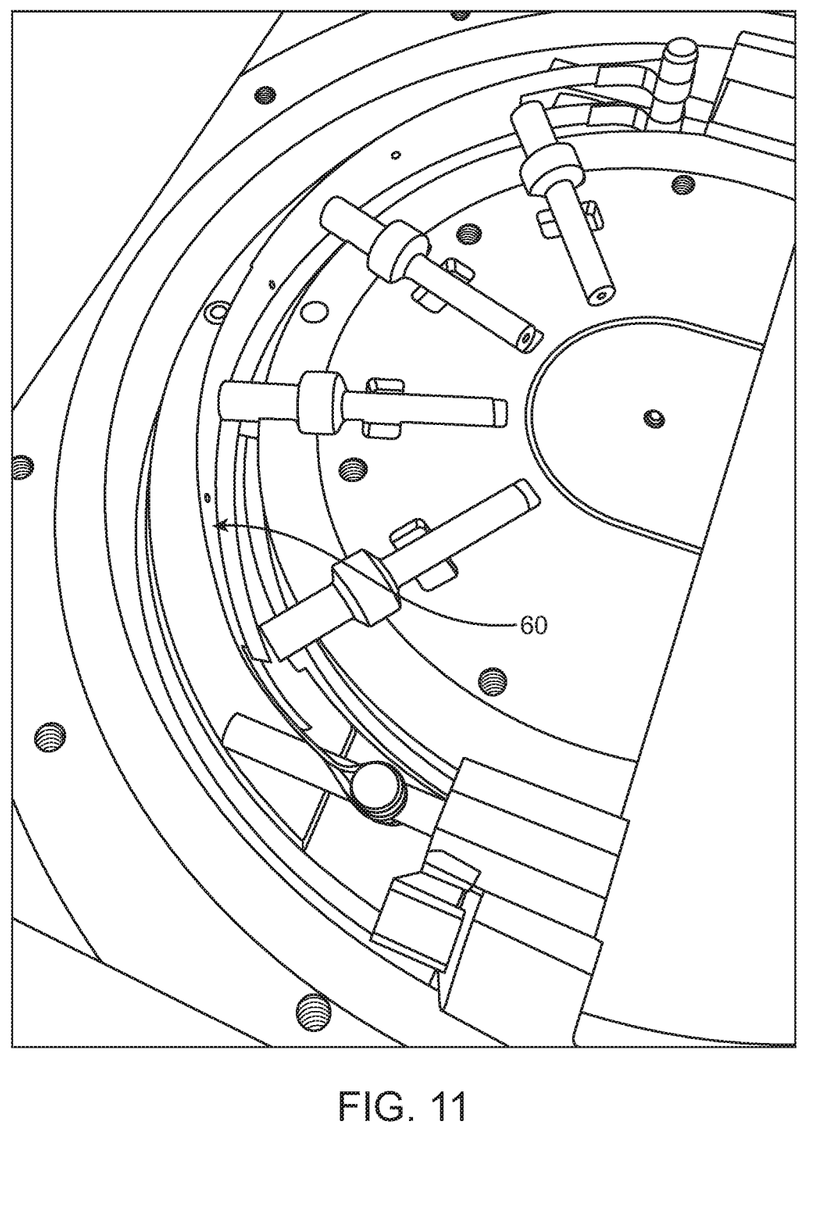
FIG. 11 is an illustration of a mold for forming the optional reinforcement band into one of the semi-circular members.

FIG. 10 is an illustration of an optional reinforcement band 60 formed within one of the semi-circular members 10. As can be seen, optional reinforcement band 60 may be formed with its ends looped around anchors 40. Preferably, optional reinforcement band 60 may be made from steel, or other suitable materials. The advantage of optional reinforcement band 60 is that it further strengthens the present system, and prevents it from possibly coming apart in the event of a flat tire. FIG. 11 is an illustration of a mold for forming the optional reinforcement band 60 into one of the semi-circular members.

What is claimed is:

1. A flat tire safety system, comprising:
   a pair of elongated semicircular members dimensioned to wrap around a tire rim and be positioned within a tire; and
   a pair of clamping assemblies, each clamping assembly securing an end of the first elongated semicircular member to the end of the second elongated semicircular member, wherein each clamping assembly comprises:
      a housing,
      a double-headed bolt passing through the housing,
      a tightening bolt mounted in the housing, wherein rotating the tightening bolt turns the double-headed bolt,
      a ratchet on the housing for permitting the tightening bolt to rotate in a tightening direction and preventing the tightening bolt from rotating in a loosening direction,
      a release on the housing for selectively permitting the tightening bolt to rotate in the loosening direction,
      a pair of anchors, wherein each anchor is embedded in the end of one of the elongated semicircular members, and wherein one end of the double-headed bolt passes through each of the anchors and
      a reinforcement band positioned within each of the pair of elongated semicircular members, wherein the reinforcement band has opposite ends that loop around the pair of anchors.

2. The flat tire safety system of claim 1, wherein the ends of the elongated semicircular members are received into one another in a male-to-female connecting interface.

3. The flat tire safety system of claim 2, wherein the clamping assemblies are positioned beside the male-to-female connecting interface.

4. The flat tire safety system of claim 3, wherein the clamping assemblies are positioned inwardly from the male-to-female connecting interface.

5. The flat tire safety system of claim 1, wherein the release is a spring-lock on the ratchet.

6. The flat tire safety system of claim 1, wherein:
   the anchors are pulled together as the double-headed bolt is rotated in a first direction, and
   the anchors are pushed apart as the double-headed bolt is rotated in a second direction.

7. The flat tire safety system of claim 1, wherein the anchors are received into holes in the elongated semicircular members.

8. The flat tire safety system of claim 1, wherein the anchors are molded into the elongated semicircular members.

9. The flat tire safety system of claim 1, wherein the elongated semicircular members are made of polyurethane.

10. The flat tire safety system of claim 1, wherein the elongated semicircular members are made of rubber.

11. The flat tire safety system of claim 1, wherein the exterior perimeter of the elongated members is flattened.

12. The flat tire safety system of claim 1, wherein the interior perimeter of the elongated members is flattened.

13. The flat tire safety system of claim 1, wherein the reinforcement band is made of steel.

14. A flat tire safety system, comprising:
   a plurality of elongated curved members dimensioned to wrap around a tire rim and be positioned within a tire; and
   a plurality of clamping assemblies, each clamping assembly securing an end of a first elongated curved member to the end of the second curved semicircular member, wherein each clamping assembly comprises:
      a housing,
      a tightening assembly in the housing, a pair of anchors, wherein each anchor is connected to the tightening assembly and the elongated curved members, wherein the tightening assembly comprises a double-headed bolt passing through the housing, a tightening bolt mounted in the housing, wherein rotating the tightening bolt turns the double-headed bolt, wherein the tightening assembly further comprises a ratchet on the housing for permitting the tightening bolt to rotate in a tightening direction and preventing the tightening bolt from rotating in a loosening direction, and a release on the housing for selectively permitting the tightening bolt to rotate in the loosening direction, wherein the tightening assembly is configured to adjust the elongated curved members around the rim, and a reinforcement band positioned within each of the pair of elongated semicircular members, wherein the reinforcement band has opposite ends that loop around the pair of anchors.

15. The system of claim 14, wherein the ends of the elongated semicircular members are received into one another in a male-to-female connecting interface.

\* \* \* \* \*